United States Patent [19]

Higuchi et al.

[11] 4,192,545
[45] Mar. 11, 1980

[54] SEAT-BACK FRAME FOR AN AUTOMOTIVE VEHICLE

[75] Inventors: Kazuo Higuchi, Tokyo; Katsuhiko Matsumoto, Kunitachi, both of Japan

[73] Assignee: Honda Giken Kogyo Kabushiki Kaisha, Tokyo, Japan

[21] Appl. No.: 944,395

[22] Filed: Sep. 21, 1978

[30] Foreign Application Priority Data

Sep. 29, 1977 [JP] Japan .................................. 52-129988

[51] Int. Cl.² .............................................. B60R 21/10
[52] U.S. Cl. ..................................... 297/216; 297/483
[58] Field of Search ......................... 297/216, 389, 452

[56] References Cited

U.S. PATENT DOCUMENTS 4,076,306   Satzinger ............................. 297/216

Primary Examiner—James C. Mitchell
Attorney, Agent, or Firm—Polster, Polster and Lucchesi

[57] ABSTRACT

A seat-back frame for automotive vehicles comprising a rectangular frame of a rigid material, the frame having two upper and two lower corners, a seat belt connected to one upper corner and a tensile member obliquely extending between an upper and a diagonally lower corner of the frame to reinforce it against rhombic deformation due to external force applied in a lateral direction of the frame due to load applied to the frame, the tensile member being flexed or bowed to some extent in the rearward direction of the seat-back frame to avoid any interference with a cushioning material and cushioning springs when they are pushed backward by an occupant leaning on the seat-back and being flexible enough to straighten under tensile load.

7 Claims, 7 Drawing Figures

SEAT-BACK FRAME FOR AN AUTOMOTIVE VEHICLE

BACKGROUND OF THE INVENTION

The present invention relates to a seat-back frame for an automotive vehicle, and, more particularly, it is concerned with a seat-back frame reinforced by a tensile member extending diagonally from an upper corner to a lower corner.

External force applied to the seat-back frame for an occupant seat in an automotive vehicle, when vehicle collision takes place, is either in the back-and-forth direction to move the seat in the front-and-back direction, or in the sidewise direction that tends to deform it sidewise with the upper corner part of the frame as a load applying or pivotal point for the deformation.

With a view to preventing such deformation of the seat-back frame due to the lateral force, there have so far been contemplated various preventive measures such as, for example, reinforcing corner plates fixed onto each of the four corners of the seat-back frame by welding, etc., or a compression-resistant strut obliquely extended between one corner of the frame and the other opposite to the former. Of these preventive measures, to be effective, the reinforcing corner plates should be made sufficiently large in size, and the compression-resistant strut such as rod material should have such a large cross-sectional area as to attain sufficient reinforcement of the seat-back frame. As the result, the frame becomes disadvantageously heavy in weight.

SUMMARY OF THE INVENTION

It is therefore an object of the present invention to provide the seat-back frame for an automotive vehicle having sufficient reinforcing strength without excessively increasing the weight of the frame.

According to the present invention, generally stated, a seat-back frame for an occupant seat in an automotive vehicle is provided which is essentially of a rectangular shape, wherein at least one pair of mutually diagonally opposed upper and lower corners are connected by a tensile member or a stay such as a steel wire including a solid wire, a stranded wire, a bundled wire, etc. (FIG. 1), a steel rod (FIGS. 2, 3 and 6), a belt-shaped thin steel plate, webbing, etc. (FIG. 4), and wherein the tensile member is bowed or flexed in the backward direction of the seat-back so as not to cause any interference with a cushioning material and cushioning springs when they are pushed backward by a back pressure due to the occupant leaning on the seat-back. For the webbing, the same material as that of the seat belt can be used. The tensile member is sufficiently flexible to straighten, between the corners, when subjected to tensile forces.

There has thus been outlined, rather broadly, the more important feature of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the concept, upon which this disclosure is based may readily be utilized as a basis for the designing of other structures for carrying out the several purposes of the present invention. It is important, therefore, that the claims be regarded as including such equivalent constructions so far as they do not depart from the spirit and scope of the present invention.

BRIEF DESCRIPTION OF THE ACCOMPANYING DRAWINGS

Specific embodiments of the present invention have been chosen for the purpose of illustration and description, and are shown in the accompanying drawings, forming a part of the specification, in which.

DETAILED DESCRIPTION OF PREFERRED EMBODIMENTS

Figure 1:
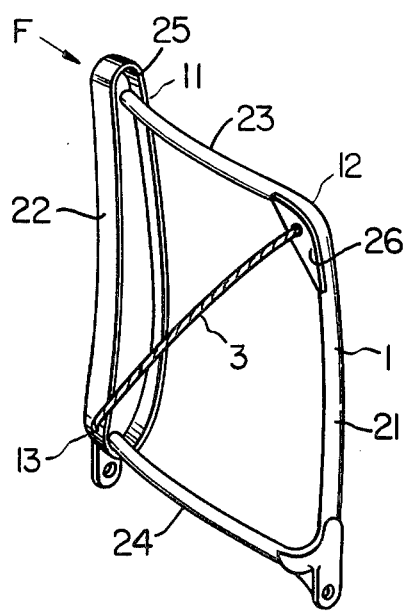
FIG. 1 is a perspective view of one embodiment of the sea-back frame according to the present invention, in which a steel wire is used.
Figure 7:
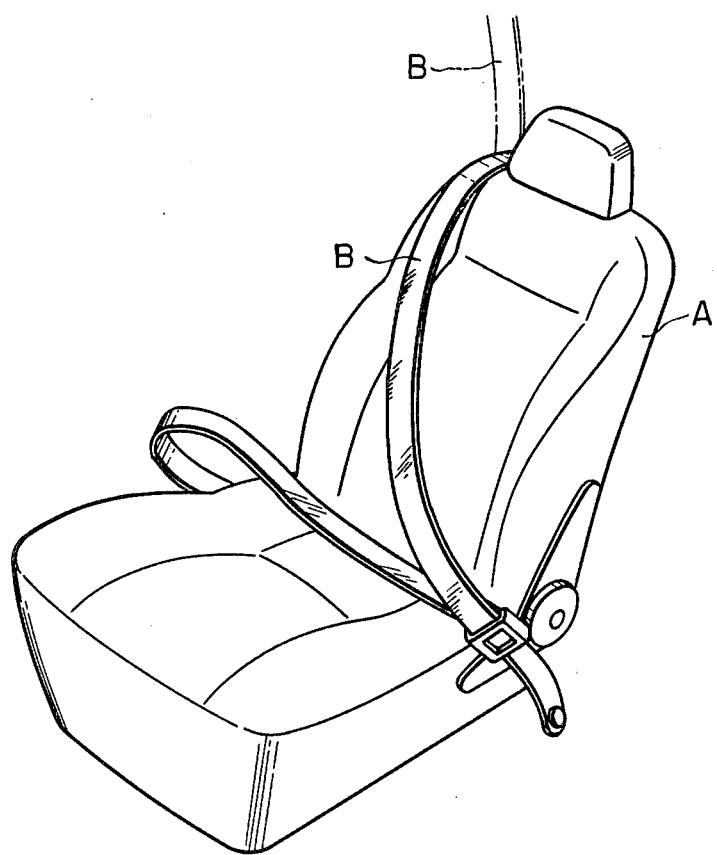
FIG. 7 is a general perspective view of one example of the passenger seat provided in the automotive vehicle.

Referring now to the drawing, and particularly to FIGS. 1 and 7, a seat A is provided with a back that includes a seat-back cushion 7, seat-back springs 8, and a seat-back frame 1, which not only supports the seat-back cushion 7 and springs 8, but provides an anchoring point for an upper end of a shoulder strap of a seat belt B.

Figure 3:
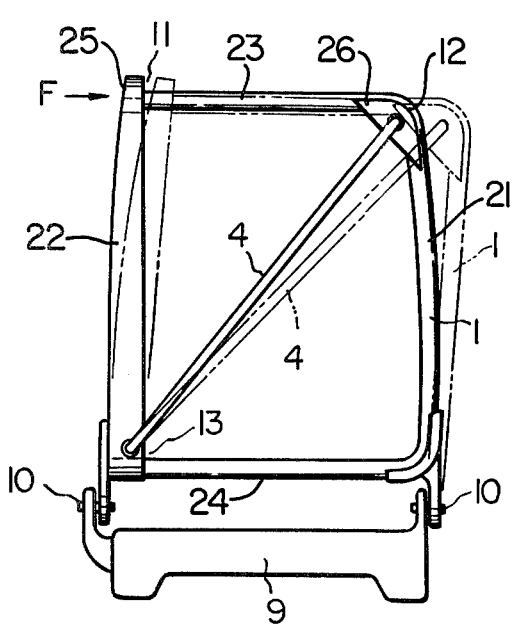
FIG. 3 is a front view of another embodiment of the seat-back frame according to the present invention, in which the steel rod shown in FIG. 2 is used.

The frame 1, in each of the embodiments shown, includes generaly vertical side rails 21 and 22 and generally horizontal top and bottom rails 23 and 24, defining a generally rectangular frame. In the illustrative embodiments shown, the top rail 23, side rail 21 and bottom rail 24 are formed of a single piece of tubing, welded or otherwise securely fastened to a heavy channel member constituting the vertical side rail 22. The shoulder strap of belt B is anchored to the upper end of the heavy rail 22, at what in FIG. 3 is the upper lefthand corner 25 of the frame 1. A gusset plate 26 spans between the upper rail 23 and the side rail 21 at the other upper corner 12 of the frame.

In the embodiment shown in FIG. 1, a tensile member in the form of a steel cable 3 has one end secured to the gusset plate 26 of the corner 12, and its other end secured to the lower end of the side rail 22, at the lower lefthand corner 13, diagonally opposite. The tensile member 3 is slightly flexed or bowed.

Figure 2:
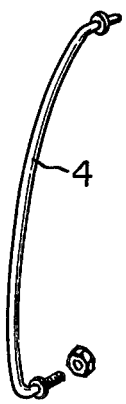
FIG. 2 is also a perspective view of a steel rod to be used as the tensile member for the seat-back frame according to the present invention.

In the embodiments shown in FIGS. 2 and 3, a tensile member 4 is in the form of a steel rod.

Figure 4:
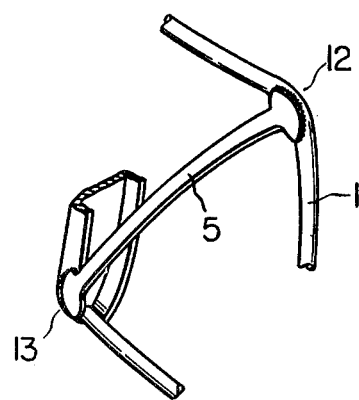
FIG. 4 is a perspective view, in part, of still another embodiment of the seat-back frame of the present invention, in which a thin steel plate is used.

In the embodiment shown in FIG. 4, a tensile member 5 is in the form of a thin steel plate.

Figure 5:
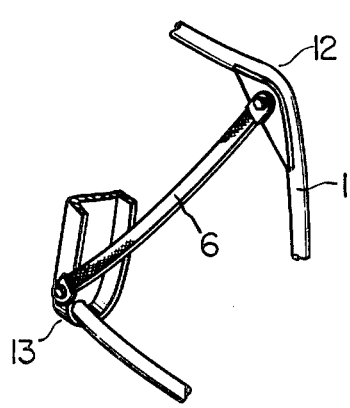
FIG. 5 is a perspective view, in part, of the seat-back frame of the present invention, in which a webbing is used.

In the embodiment shown in FIG. 5, a tensile member 6 is in the form of webbing.

As briefly stated in the preceding paragraphs, when the frame 1 in the drawing is reinforced by the tensile member, it becomes possible to sufficiently resist the rhombic deformation of the seat-back frame 1, even if a material having relatively small cross-sectional area is used as the tensile member. As the result, satisfactory reinforcement of the frame can be attained without excessively increasing the weight of the seat-back frame as a whole.

Figure 6:
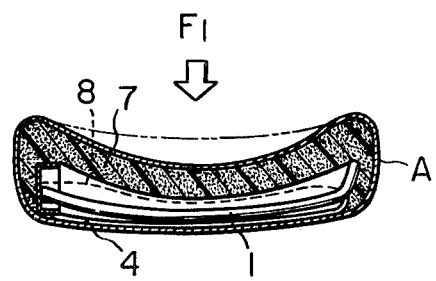
FIG. 6 is a cross-sectional view of the seat-back for automotive vehicles.

Since, according to the present invention, the tensile member is not linearly extended between the diagonally opposed corners 12 and 13, but is slightly bowed or flexed in the backward direction of the seat-back, when a seat-back cushion 7 and seat-back springs 8 are pushed backward by a back pressure $F_1$ of a crew or passenger as shown in FIG. 6, the seat-back springs 8 and others do not interfere with the tensile member, so that the cushioning property of these seat-back cushion 7 and the seat-back spring 8 is not impaired at all. Because of the slight bow or flex in the tensile member application of lateral force, as indicated by the arrow F in FIG. 1 results in slight rhombic deformation of the frame 1 (as shown in FIG. 3 in a double-dot-and-dash line), but, beyond that amount, the deformation is inhibited because the tensile member is linearly extended, and the frame withstands a high load imposed with a small range of deformation, hence there is no problem of the strength of the frame. Reference numeral 9 in FIG. 3 designates a seat cushion frame, and a reference numeral 10 designates a connecting shaft (the center of pivotal movement) of the seat-back frame 1 to the frame 9.

What is claimed is:

1. In a seat-back frame for an occupant seat in an automotive vehicle which comprises a generally rectangular frame having generally vertical side rails and generally horizontal upper and lower rails defining upper and lower corners beween adjacent rails and a seat belt having an end anchored to said frame at one upper corner thereof, the improvement comprising a tensile member connected to and extending between one of said upper corners and a diagonally opposed lower corner of said frame, said tensile member being bowed in the backward direction of said seat-back so as not to cause interference with a cushioning material and cushioning springs when they are pushed backward by an occupant of the seat and sufficiently flexible to straighten in response to rhomboidal deformation of the frame in the direction in which the tensile member tends.

2. The improvement as set forth in claim 1, wherein said tensile member is made of solid wire.

3. The improvement as set forth in claim 1, wherein said tensile member is made of a stranded wire.

4. The improvement as set forth in claim 1, wherein said tensile member is made of a bundled wire.

5. The improvement as set forth in claim 1, wherein said tensile member is made of a steel rod.

6. The improvement as set forth in claim 1, wherein said tensile member is made of a belt-shaped thin steel plate.

7. The improvement as set forth in claim 1, wherein said tensile member is made of a webbing.

* * * * *